(12) United States Patent
Miyako et al.

(10) Patent No.: US 6,689,971 B2
(45) Date of Patent: Feb. 10, 2004

(54) STOPPER FOR FLAT CABLE AND MOUNTING STRUCTURE OF FLAT CABLE

(75) Inventors: Mamoru Miyako, Aichi (JP); Shinji Watanabe, Aichi (JP); Toshihito Takai, Aichi (JP)

(73) Assignee: Kabushiki Kaisha Tokai Denki Seisakusho, Aichi (JP)

(*) Notice: Subject to any disclaimer, the term of this patent is extended or adjusted under 35 U.S.C. 154(b) by 0 days.

(21) Appl. No.: 10/213,567

(22) Filed: Aug. 7, 2002

(65) Prior Publication Data

US 2003/0029703 A1 Feb. 13, 2003

(30) Foreign Application Priority Data

Aug. 10, 2001 (JP) .................................. 2001-243640
Jul. 15, 2002 (JP) .................................. 2002-205602

(51) Int. Cl.[7] .............................................. H01H 9/00
(52) U.S. Cl. ........................ 200/61.54; 200/61.27; 439/15
(58) Field of Search ................ 200/61.54, 61.27, 200/5 A, 5 R; 439/15, 164, 494; 174/72 A (56) References Cited

U.S. PATENT DOCUMENTS

| 4,811,922 | A | * | 3/1989 | Yoneyama | 174/72 A |
| 5,645,441 | A | * | 7/1997 | Okuhara et al. | 439/164 |
| 5,895,889 | A | * | 4/1999 | Uchida et al. | 174/72 A |
| 5,977,495 | A | * | 11/1999 | Akimoto | 200/61.54 |
| 6,323,428 | B1 | * | 11/2001 | Takano | 174/117 F |
| 6,462,290 | B1 | * | 10/2002 | Matsumoto | 200/61.54 |

* cited by examiner

Primary Examiner—Lincoln Donovan
Assistant Examiner—M. Fishman
(74) Attorney, Agent, or Firm—Crompton, Seager & Tufte, LLC (57) ABSTRACT

A manipulation switch for operating a device that is installed in an automobile by remote control is arranged on a switch body, which is mounted on a steering wheel. A stopper attaches a flat cable, which is electrically connected to the switch body, to the steering wheel. The stopper is adhered to the flat cable. The stopper includes a flange, which extends sideways from the side edge of the flat cable. An engaging hole is formed in the flange. The switch body has an engaging projection, which is engaged with the engaging hole of the flange.

17 Claims, 13 Drawing Sheets

STOPPER FOR FLAT CABLE AND MOUNTING STRUCTURE OF FLAT CABLE

BACKGROUND OF THE INVENTION

The present invention relates to a stopper for mounting a flat cable to a switch body of a manipulation switch located on a steering wheel. The present invention also pertains to a mounting structure of a flat cable using the stopper.

Recently, typical automobiles are equipped with devices such as car audio equipment and hands-free mobile phones, which are operated by remote control using manipulation switches. The manipulation switches are arranged on the left and right sides of a pad located on a steering wheel. For example, a set of manipulation switches for car audio equipment is arranged on the left side of the steering wheel and a set of manipulation switches for a hands-free mobile phone is arranged on the right side of the steering wheel. Each set of manipulation switches is mounted on a switch body, which is arranged on the left side or the right side of the pad on the steering wheel. The switch bodies are electrically connected to each other by a flexible flat cable, which is arranged in the steering wheel. More specifically, connectors are arranged on the ends of the flat cable. Each connector is inserted in a connector housing, which is arranged in the corresponding switch body.

The above mentioned flat cable does not have any structure for securing the flat cable to the steering wheel other than the connectors, which are located on the ends of the flat cable. Therefore, if any of the connectors is caught on a component that constitutes the steering wheel when assembling the steering wheel, the connector could be disconnected. Therefore, the flat cable is secured at a portion other than the ends of the flat cable. For example, engaging holes are formed in the flat cable at predetermined intervals and engaging projections are formed on the switch bodies. When the engaging projections are engaged with the engaging holes, a part of the flat cable is secured. However, the flat cable is generally required to endure a predetermined tensile load (98N). This problem is solved by reinforcing the entire flat cable such that the cable endures the predetermined tensile load. However, adding a reinforcing member or increasing the thickness of an insulating coating of the flat cable not only increases the cost but also increases the size of the flat cable.

To prevent the flat cable from being damaged, a portion of the insulating coating of the flat cable is extended sideways to form a flange and an engaging hole is formed in the flange. That is, the engaging hole and the engaging projection are engaged at a portion away from core wires of the flat cable. In this case, even when the tensile load is applied to the flat cable, the insulating coating of the flat cable is prevented from being damaged.

However, such structure causes other problems. Since the flange having the engaging hole is integrally formed with the insulating coating of the flat cable, the position of the flange is determined in advance. Therefore, to adjust the flange to the engaging projection of the steering wheel, the flat cable is cut by a predetermined length. This adjusts the position of the engaging hole with respect to the engaging projection. This method causes a lot of wasted flat cable, which reduces yields.

BRIEF SUMMARY OF THE INVENTION

Accordingly, it is an objective of the present invention to attach a flat cable to a switch body at low cost. It is also an objective of the present invention to provide a flat cable that sufficiently endures the tensile load. The further objective of the present invention is to provide a flat cable that can be cut at any position to improve yields.

To achieve the above objective, the present invention provides a structure for mounting a flat cable to a steering wheel. The flat cable is electrically connected to a switch body. The switch body includes a manipulation switch for operating a device that is installed in an automobile by a remote control. The mounting structure includes a stopper and an engaging projection. The stopper is adhered to the flat cable and includes a flange at least on one end. The flange extends sideways from the side edge of the flat cable. An engaging hole is formed in the flange. The engaging projection is arranged on the switch body. The engaging projection is engaged with the engaging hole of the flange.

According to the present invention, the flange extends sideways from the side edge of the flat cable. Thus, the engaging holes need not be formed in the flat cable itself. Therefore, even when the flat cable is attached to the steering wheel in a stretched state, the tensile load is mostly applied to the stopper, in which engaging hole is formed, and is not directly applied to the flat cable. Thus, the flat cable sufficiently endures the tensile load. Also, the stopper has a simple structure of adhering sheet material and is easily manufactured at low cost.

Further, the stopper is attached to the flat cable by adhering the sheet material. Therefore, the position of the stopper can be varied in the longitudinal direction of the flat cable. Therefore, the flat cable can be cut at any position and is used fully. As a result, the flat cable is not wasted, which improves yields. The sheet material is adhered by heat welding, ultrasonic welding, or by an adhesive if the sheet material is made of, for example, synthetic resin.

Other aspects and advantages of the invention will become apparent from the following description, taken in conjunction with the accompanying drawings, illustrating by way of example the principles of the invention.

BRIEF DESCRIPTION OF THE SEVERAL VIEWS OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A first embodiment of the present invention will now be described with reference to figures.

Figure 1:
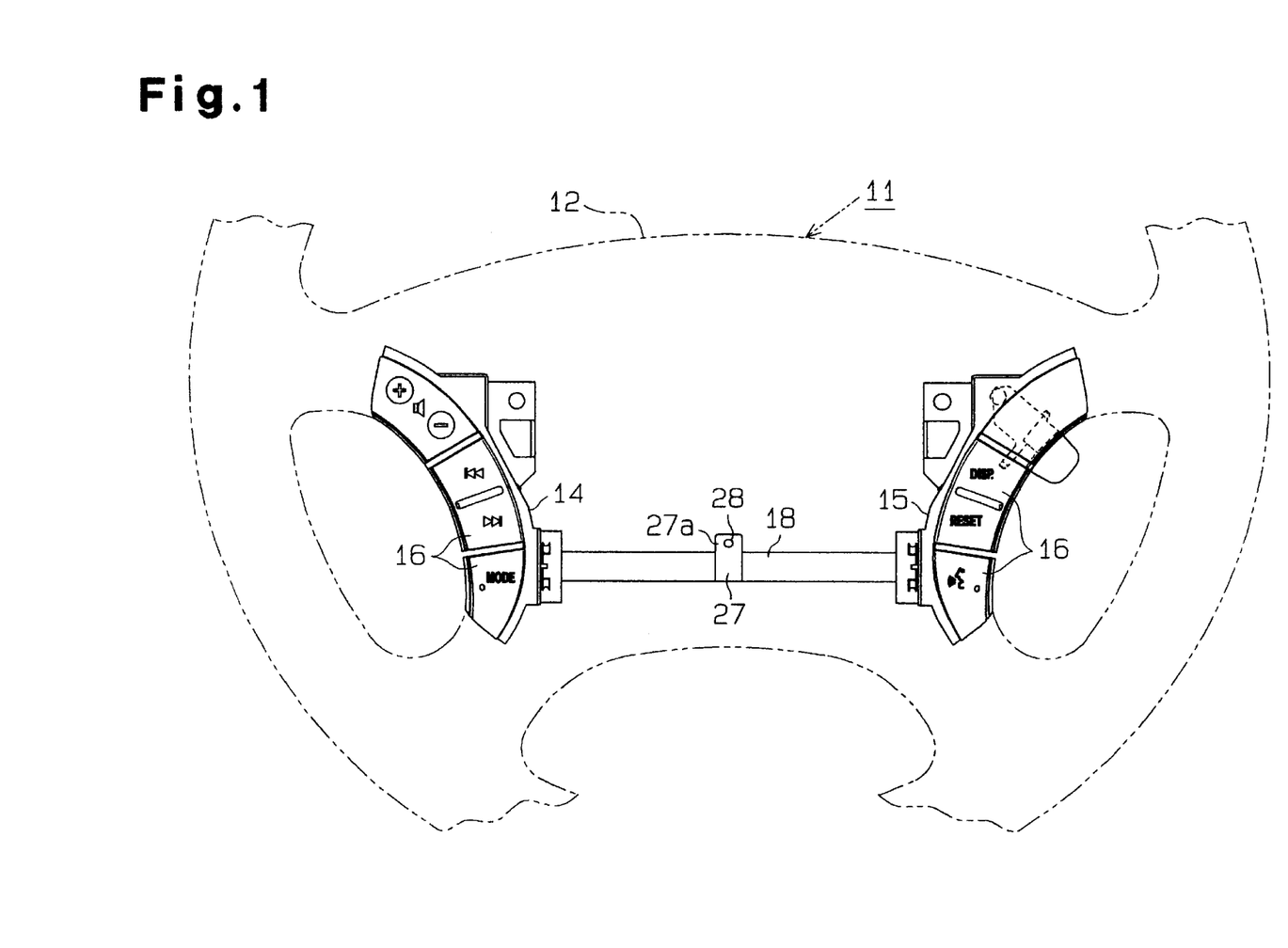
FIG. 1 is a front view illustrating a flat cable according to a first embodiment of the present invention when attached to a steering wheel.
Figure 2:
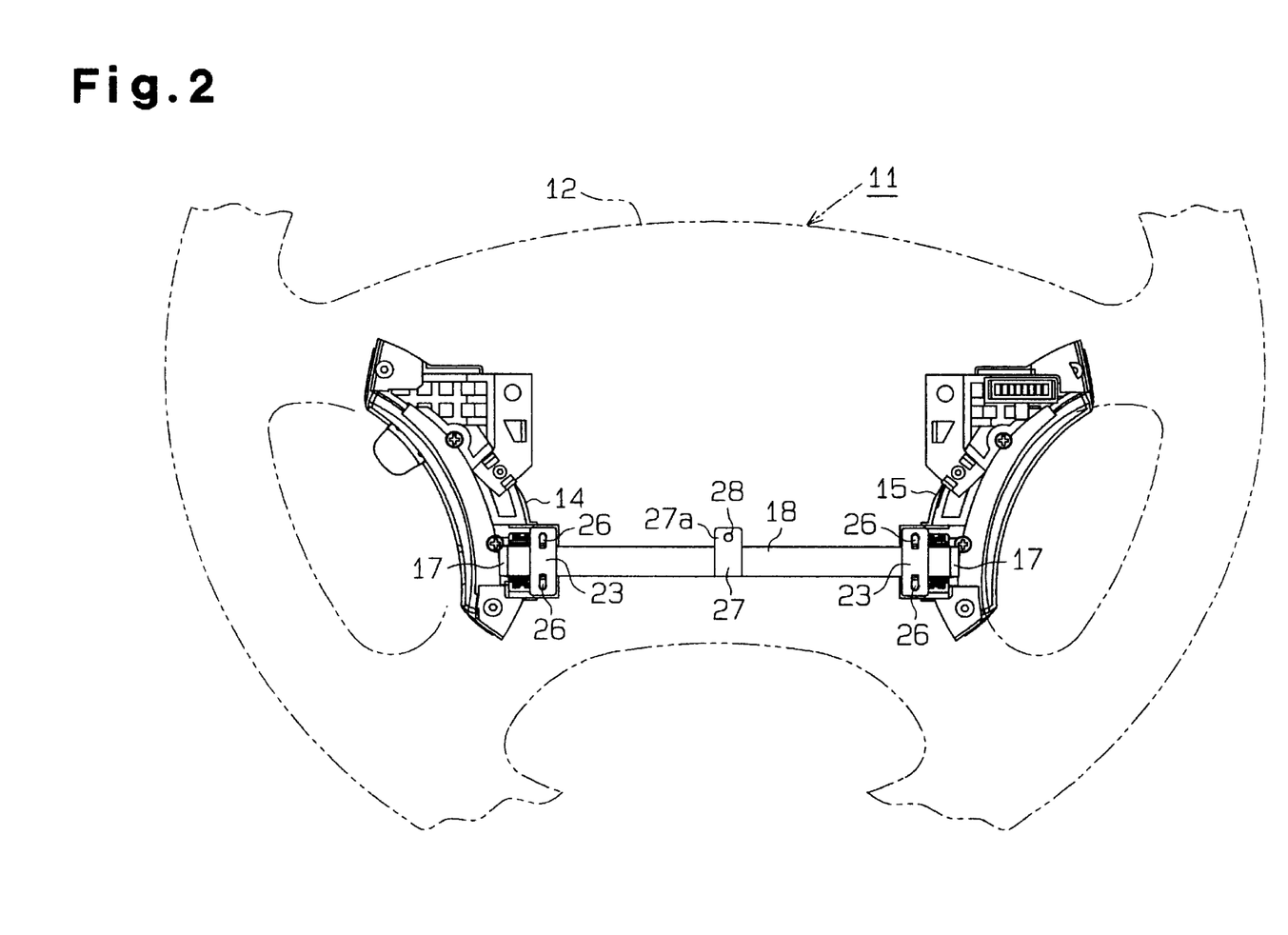
FIG. 2 is a rear view illustrating the flat cable of FIG. 1 when attached to the steering wheel.
Figure 3:
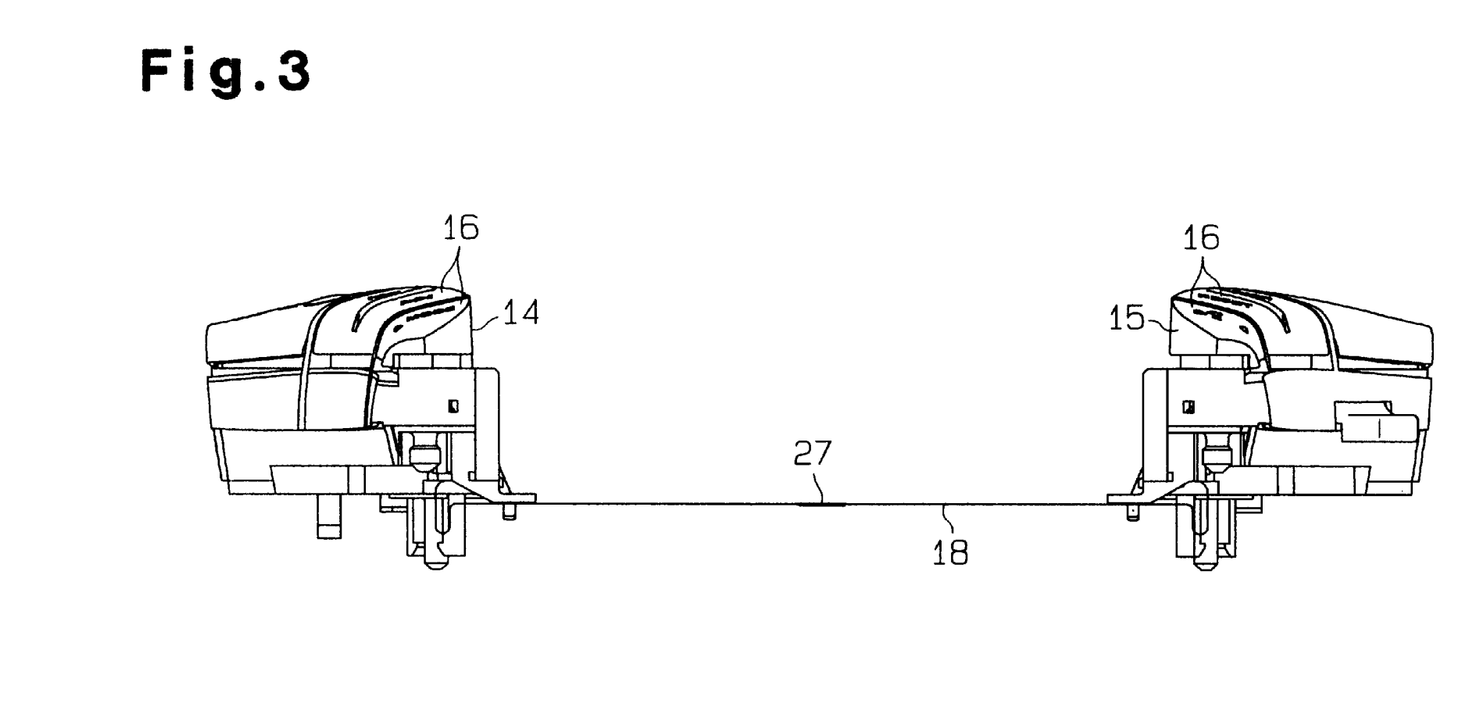
FIG. 3 is a side view illustrating the flat cable of FIG. 1 when attached to the steering wheel.

As shown in FIGS. 1 to 3, a steering wheel 11 of an automobile includes a pad 12 at its center. A first switch body 14 is arranged on one side of the pad 12 and a second switch body 15 is arranged on the other side of the pad 12. Each of the first and second switch bodies 14, 15 has manipulation switches 16 for operating devices that are installed in the automobile by remote control. The devices include, for example, a car audio system, a hands-free mobile phone, and a navigation system. The manipulation switches 16 that are arranged on the first switch body 14 are used for an audio system and the manipulation switches 16 that are arranged on the second switch body 15 are used for a hands-free mobile phone.

A flat cable 18 is located at the rear of and between the first and second switch bodies 14, 15. The flat cable 18 has connectors 17 on the ends. A connector housing (not shown) is arranged on the side surface of each first and second switch body 14, 15 such that the connector housings face each other. Each connector 17 is connected to one of the connector housings. Thus, the first and the second switch bodies 14, 15 are electrically connected by the connectors 17.

Figure 4:
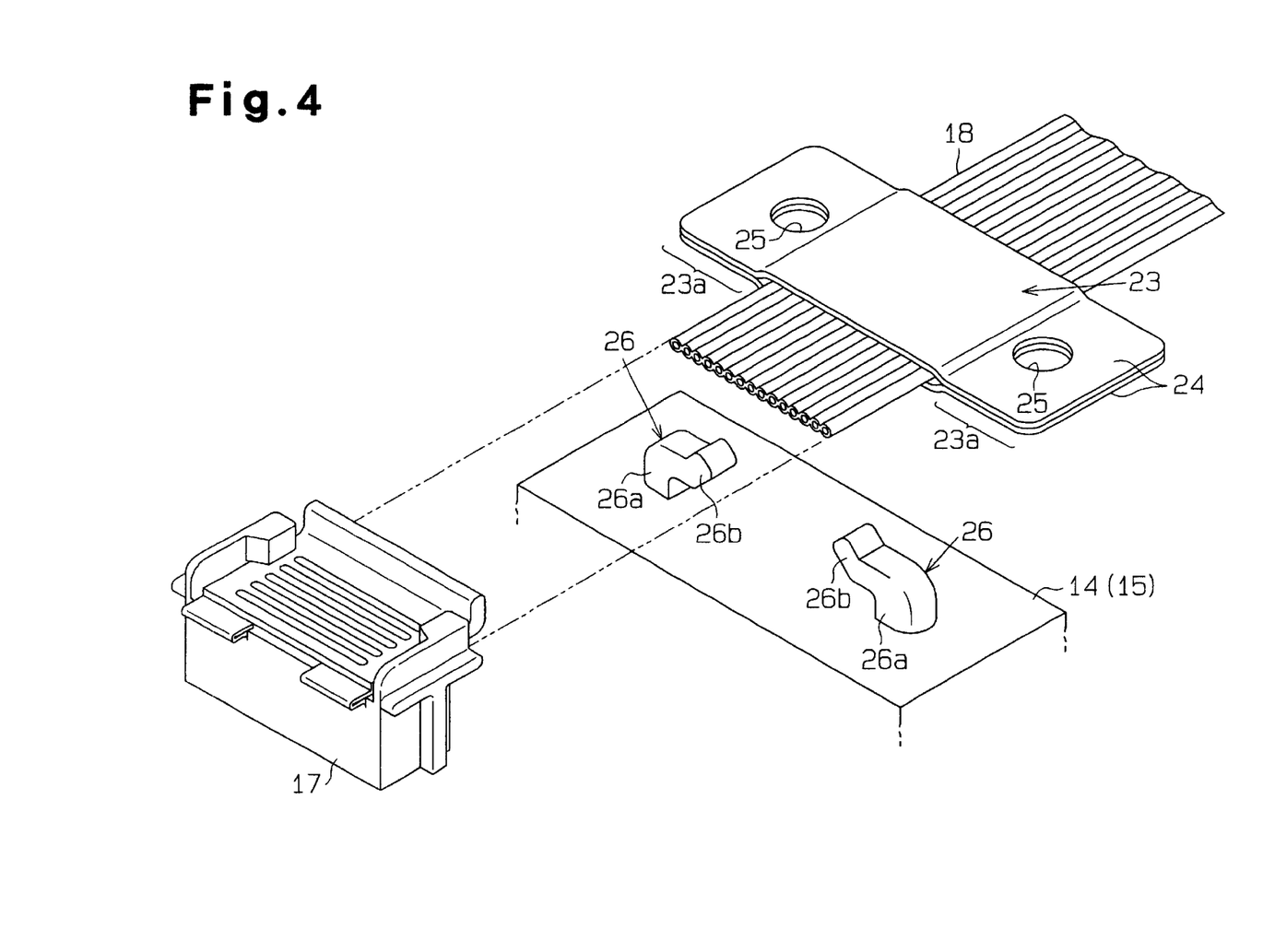
FIG. 4 is an exploded perspective view illustrating a stopper and engaging projections of the flat cable of FIG. 1 when separated from each other.

As shown in FIGS. 2 and 4, a stopper 23 is arranged on each end of the flat cable 18. Each stopper 23 secures the corresponding end of the flat cable 18 to one of the first and second switch bodies 14, 15. Each stopper 23 includes two sheet materials 24, which are adhered to each other with the flat cable 18 arranged in between. The sheet materials 24 are rectangular and made of flexible synthetic resin, such as polypropylene (PP) and polyethylene terephthalate (PET).

Flanges 23a are formed on the longitudinal ends of each stopper 23 extending sideways from the side edges of the flat cable 18. Each flange 23a has a circular engaging hole 25. The shape of the engaging holes 25 may be changed as required. The engaging holes 25 may have, for example, elliptical shape.

As shown in FIGS. 2 and 4, two engaging projections 26 are formed at the rear of each first and second switch body 14, 15 away from each other by a predetermined distance. The engaging projections 26 are made of synthetic resin and are formed integrally with the corresponding first or second switch body 14, 15. Each engaging projection 26 includes a main portion 26a and an inclined portion 26b. The main portion 26a is L-shaped and extends toward the center. The inclined portion 26b projects at an angle from the distal end of the main portion 26a. The inclined portions 26b are straight and the distance between the opposing inclined portions 26b increases toward the proximal ends.

Figure 6:
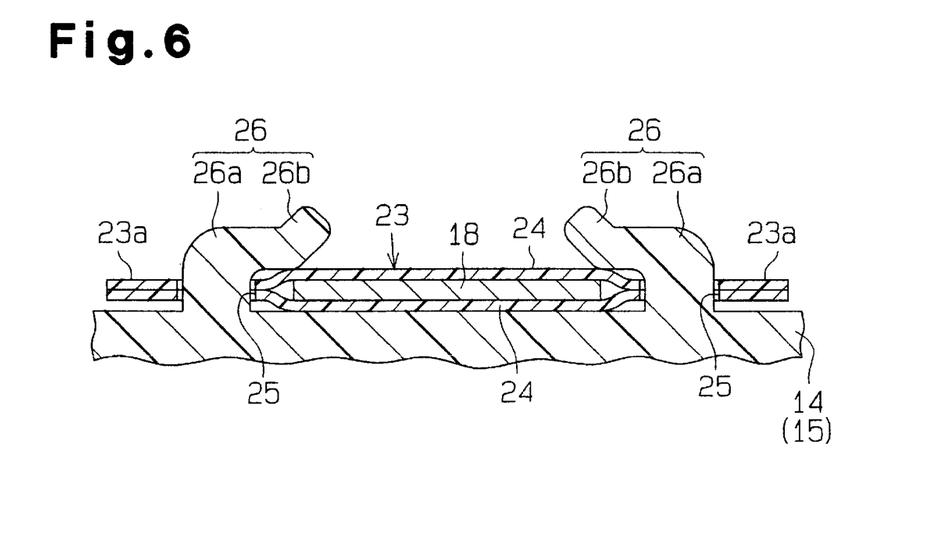
FIG. 6 is a cross-sectional view illustrating the stopper when attached to the engaging projections.

As shown in FIG. 6, the engaging holes 25 of each stopper 23 are engaged with the corresponding engaging projections 26. The engagement of the engaging holes 25 with the engaging projections 26 secures each end of the flat cable 18 to the corresponding first or second switch body 14, 15. Since the distance between the engaging projections 26 at the distal end is narrower than the distance between the engaging projections 26 at the proximal end, the engaging holes 25 do not easily come off the engaging projections 26.

The distance between the centers of the engaging holes 25 formed in each end of the flat cable 18 is substantially the same as the distance between the proximal ends of the engaging projections 26 provided on each switch body 14, 15. Therefore, when the flat cable 18 is attached to the steering wheel 11, the flat cable 18 is stretched by a predetermined tensile load (98N). This prevents the flat cable 18 from being caught by surrounding members.

As shown in FIGS. 1 and 2, a fixture 27 is located at the middle of the flat cable 18. The fixture 27 has the same structure as the stoppers 23. That is, the fixture 27 includes two sheet materials 24, which are adhered to each other with the flat cable 18 arranged in between. A flange 27a is formed on one end of the fixture 27. The flange 27a extends sideways from one of the side edges of the flat cable 18. The flange 27a has an engaging hole 28. That is, the fixture 27 differs from the stoppers 23 in that the fixture 27 has only one engaging hole 28. The engaging hole 28 is engaged with a boss (not shown), which is located at the rear of the steering wheel 11. The engagement of the engaging hole 28 with the boss secures the middle portion of the flat cable 18 to the steering wheel 11.

A method for attaching the ends of the flat cable 18 to the rear side of the first and second switch bodies 14, 15 will now be described.

Figure 5:
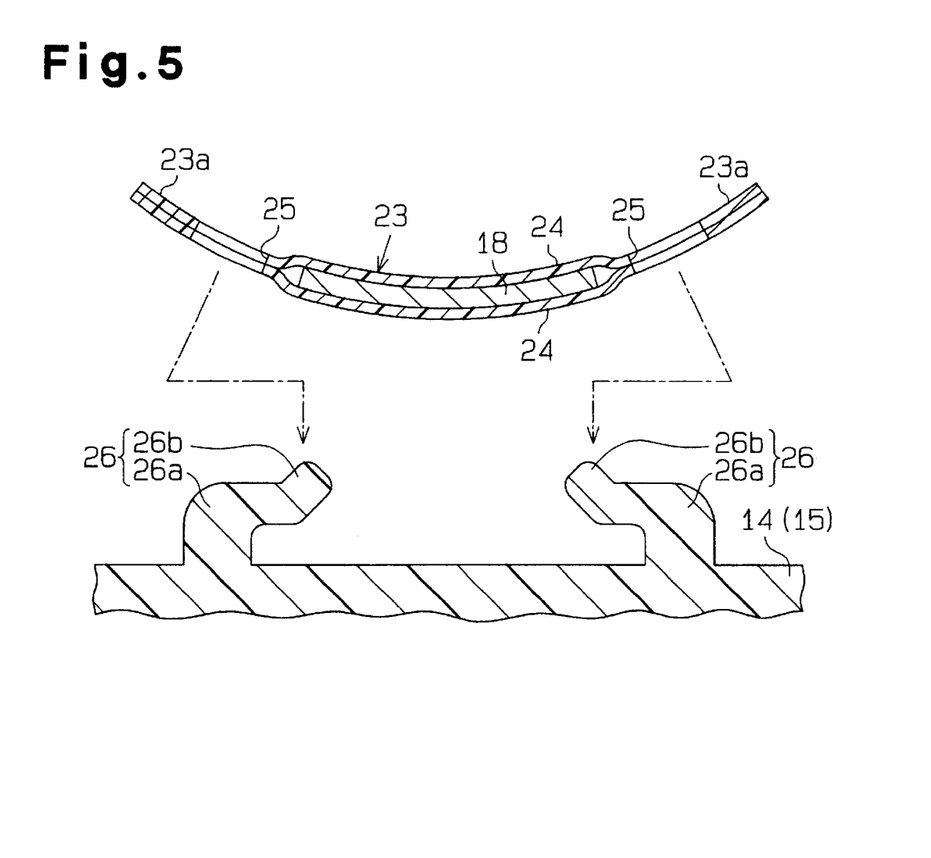
FIG. 5 is a cross-sectional view illustrating the stopper before being attached to the engaging projection.

As shown in FIG. 5, the engaging holes 25 are fitted to the corresponding engaging projections 26 while flexing each stopper 23. While widening the stopper 23 along the inclined portions 26b, the engaging holes 25 are engaged with the main portions 26a of the engaging projections 26. Then, pressing the stopper 23 toward the proximal ends of the engaging projections 26 as shown in FIG. 6 makes the stopper 23 flat and the middle portion of the stopper 23 is located inward of the engaging projections 26. In this state, the main portion 26a of each engaging projection 26 presses the stopper 23 against the corresponding first or second switch body 14, 15 so that the stopper 23 is not displaced.

The first embodiment provides the following advantages.

(1) The engaging holes 25 are each formed in one of the flanges 23a, which are arranged on the ends of the stopper 23. The engaging holes 25 engage with the engaging projections 26, which are located on each of the first and second switch bodies 14, 15. The engagement of the engaging holes 25 with the engaging projections 26 secures the flat cable 18 to the first and second switch bodies 14, 15. Since the engaging holes 25 are not directly formed on the flat cable 18, even when the flat cable 18 is stretched when being attached to the first and the second switch bodies 14, 15, the great tensile load is prevented from being directly applied to the flat cable 18. That is, the tensile load applied to the flat cable 18 is reduced. As a result, the flat cable 18 sufficiently endures the tensile load, thereby protecting the connectors 17. Further, since the flat cable 18 does not require a reinforcing member, the size of the flat cable 18 is prevented from increasing and the manufacturing cost is prevented from increasing by an increase in the assembling procedure.

(2) Each stopper 23 is structured only by adhering two sheet materials 24, which are made of synthetic resin, with each other. Therefore, the stoppers 23 are easily manufactured.

(3) Each stopper 23 is secured to the flat cable 18 by adhering two sheet materials 24 with each other. Thus, the flat cable 18 is secured by each stopper 23 at any desired position. Therefore, even when the length of the flat cable 18 or the distance between the engaging projections 26 of the first switch body 14 and the engaging projections 26 of the second switch body 15 differ because of difference in the vehicle type or modification in the specification, the flat cable 18 is cut at any position and used. As a result, the flat cable 18 is fully used, which improves yields.

(4) The distance between the two engaging projections 26 located on each of the first and the second switch bodies 14, 15 at the distal end is narrower than that at the proximal end. This prevents the engaging holes 25 from coming off the engaging projections 26. As a result, the flat cable 18 is stably secured to the first and second switch bodies 14, 15.

(5) Each stopper 23 is easily fixed by engaging the engaging holes 25 with the corresponding engaging projections 26 while flexing the stopper 23. Further, the inclined portions 26b are formed at the distal ends of the two engaging projections 26, which face each other. The distance between the inclined portions 26b increases toward the proximal ends. Therefore, each stopper 23 is smoothly widened to a flat shape while the engaging holes 25 of the stopper 23 are guided along the inclined portions 26b. Thus, the engaging holes 25 formed in each stopper 23 are easily fitted to the proximal end of the engaging projections 26. As a result, the stopper 23 is more easily fixed.

A second embodiment of the present invention will now be described. The differences from the first embodiment will mainly be discussed below.

Figure 7:
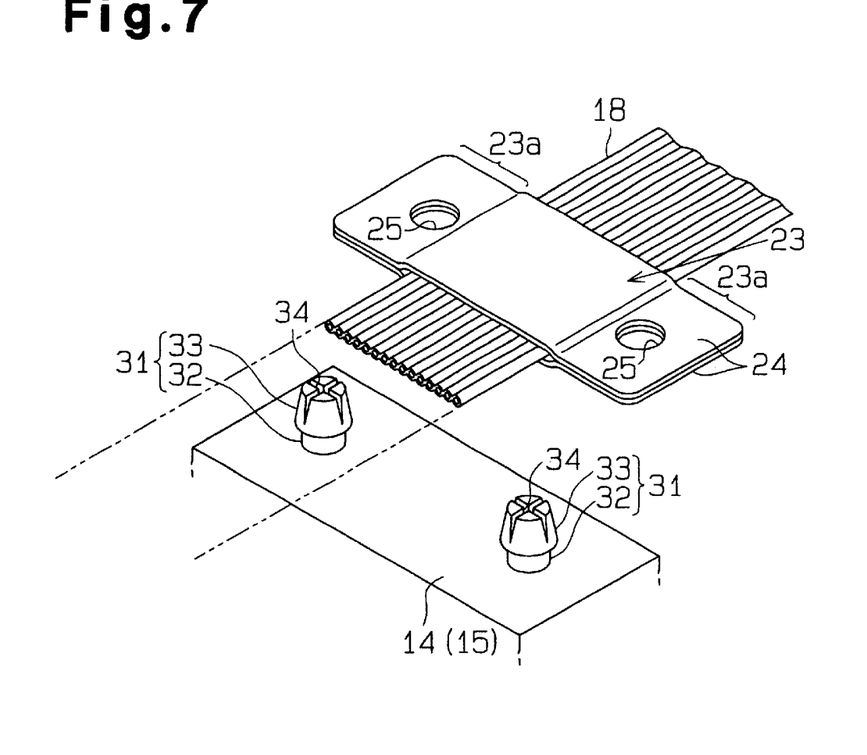
FIG. 7 is an exploded perspective view illustrating a stopper and engaging projections according to a second embodiment when separated from each other.
Figure 8:
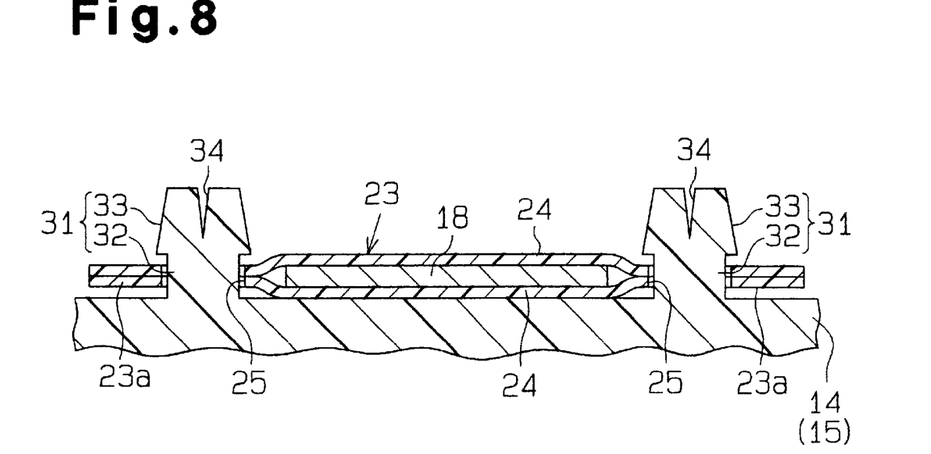
FIG. 8 is a cross-sectional view illustrating the stopper and the engaging projections according to the second embodiment when engaged with each other.

As shown in FIGS. 7 and 8, engaging projections 31 are formed on each of the first and second switch bodies 14, 15. Each engaging projection 31 includes a cylindrical base portion 32 and a retainer 33, which is arranged on the distal end of the base portion 32. A groove 34 is formed on the distal end surface of each retainer 33. The groove 34 has a cruciform cross-section and extends in the axial direction of the retainer 33. The retainers 33 become narrower when the engaging holes 25, which are formed in each stopper 23, are fitted to the engaging projections 31. Therefore, the engaging projections 31 are easily engaged with the engaging holes 25.

The outer diameter of the proximal ends of the retainers 33 (largest diameter of the retainer 33) are larger than the outer diameter of the base portions 32 and are slightly larger than the inner diameter of the engaging holes 25, which are formed in each stopper 23. The outer diameter of the base portions 32 and the inner diameter of the engaging holes 25 are substantially the same. Thus, when the engaging holes 25 are engaged with the engaging projections 31, the circumferential portion of each engaging hole 25 abuts against the proximal end surface of the corresponding retainer 33. This prevents the stopper 23 from coming off the engaging projections 31.

Therefore, the second embodiment provides substantially the same advantages as the first embodiment.

Figure 9:
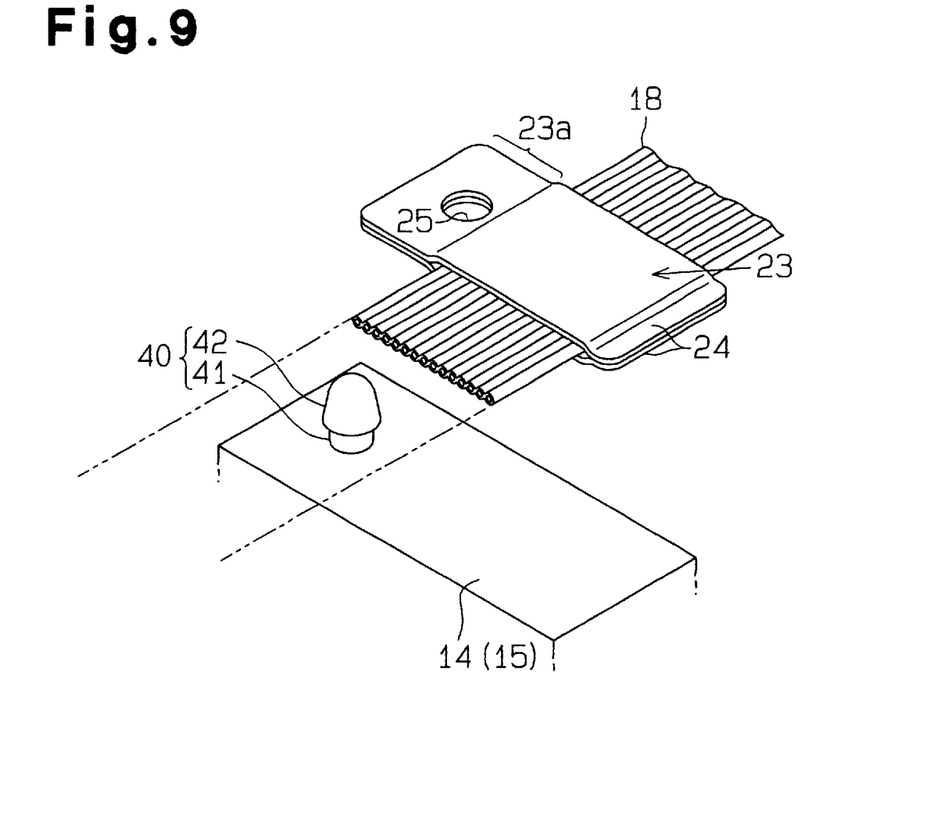
FIG. 9 is an exploded perspective view illustrating a stopper and engaging projections according to a third embodiment when disengaged from each other.
Figure 10:
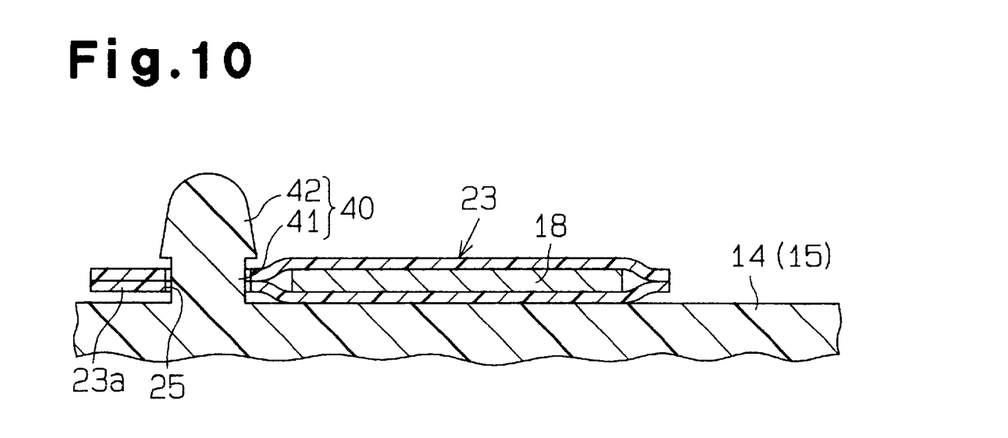
FIG. 10 is a cross-sectional view illustrating the stopper and the engaging projections according to the third embodiment when engaged with each other.

A third embodiment of the present invention will now be described with reference to FIGS. 9 and 10. As shown in FIGS. 9 and 10, the flange 23a is formed only on one end of the stopper 23 and only one engaging hole 25 is formed in the flange 23a. An engaging projection 40 includes a base portion 41 and a retainer 42, which is formed on the distal end of the base portion 41 in the same manner as the engaging projections 31 of the second embodiment. The engaging hole 25 is engaged with the engaging projection 40.

The third embodiment differs from the second embodiment in that the distal end of the retainer 42 is semispherical. Further, the groove 34 shown in the second embodiment is omitted. The third embodiment provides substantially the same advantages as the first embodiment.

Figure 11:
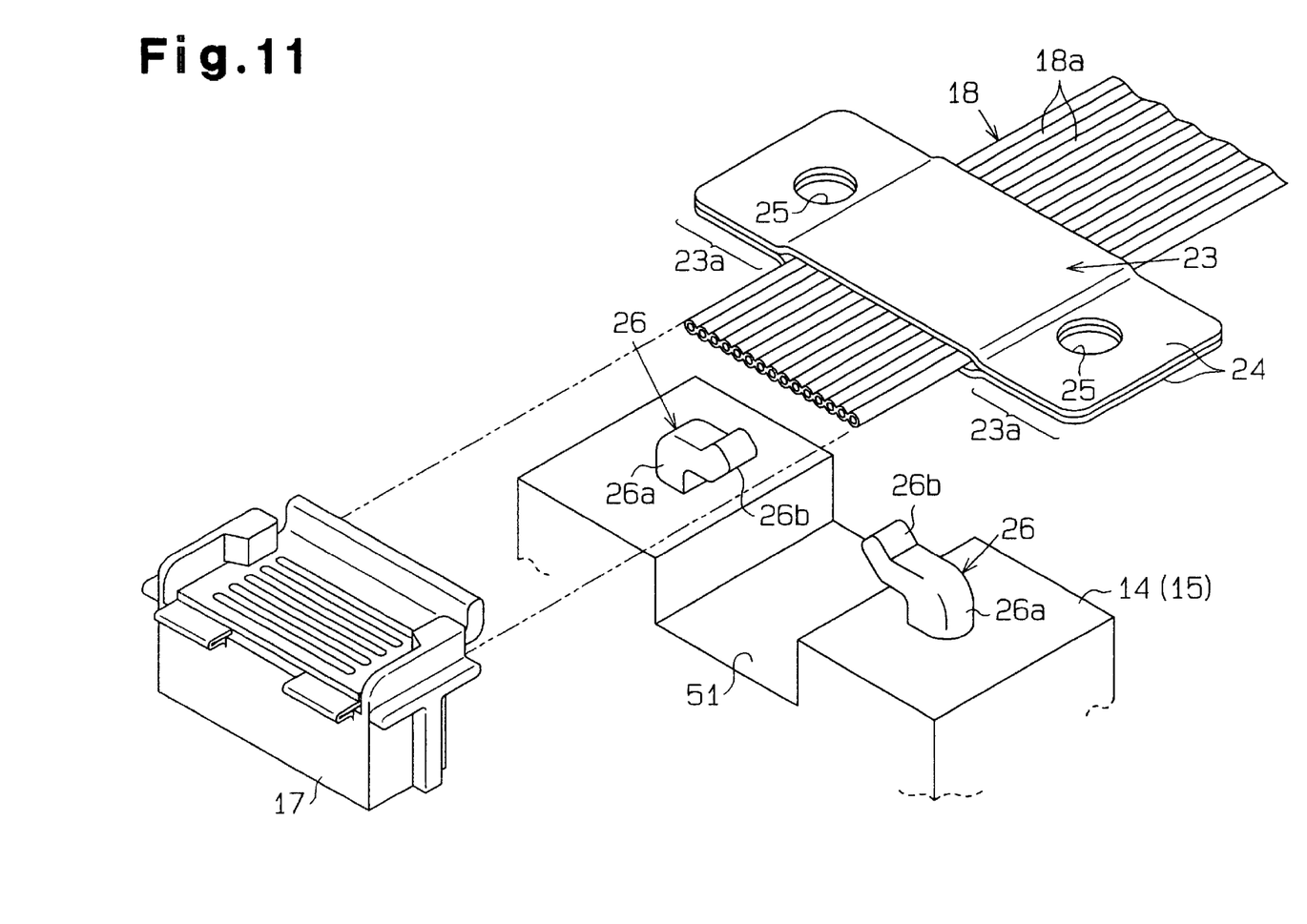
FIG. 11 is an exploded perspective view illustrating a stopper and engaging projections according to a fourth embodiment when disengaged from each other.
Figure 12:
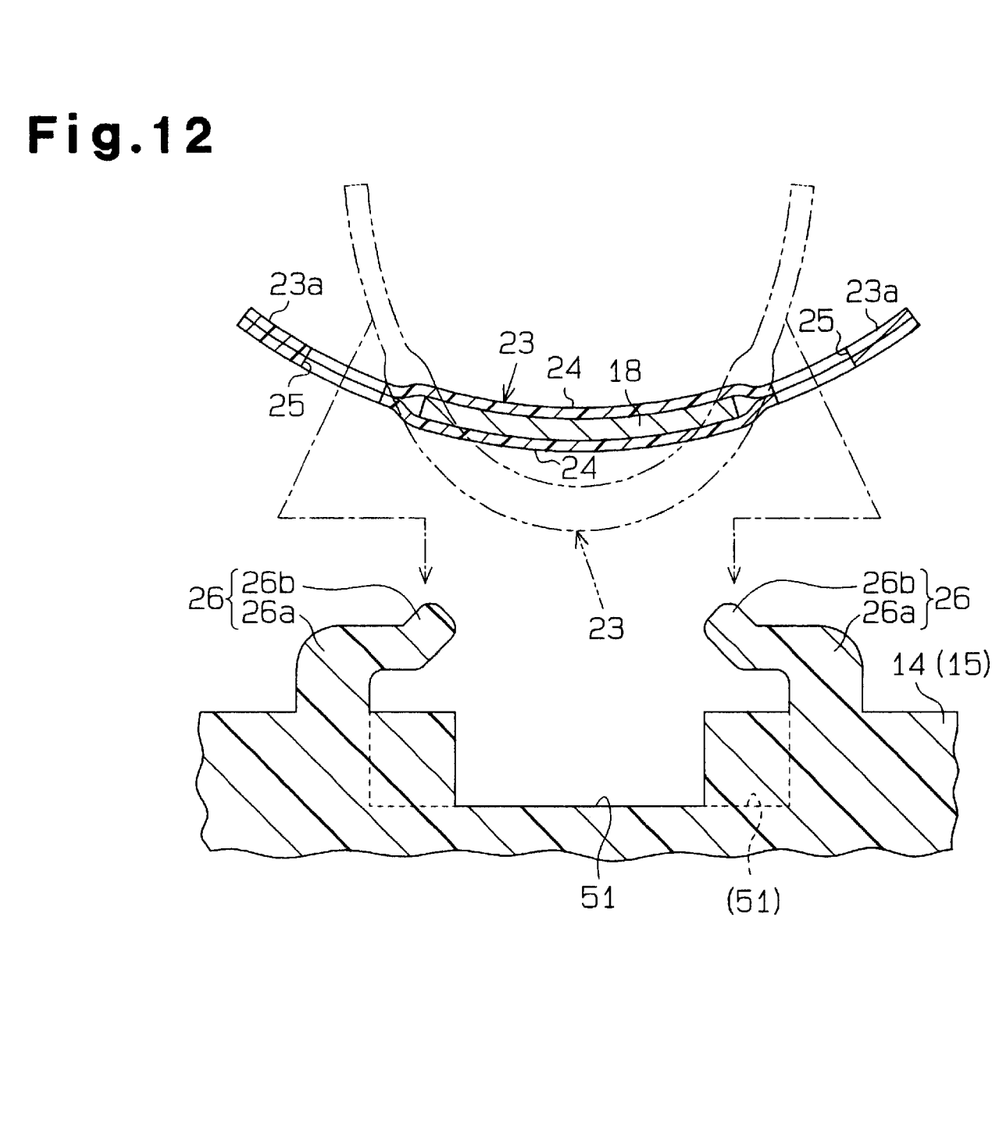
FIG. 12 is a cross-sectional view illustrating the stopper and the engaging projections according to the fourth embodiment when engaged with each other.

A fourth embodiment of the present invention will now be described with reference to FIGS. 11 and 12. As shown in FIGS. 11 and 12, a recess 51 is formed between the engaging projections 26 at the rear of each first and second switch body 14, 15. In the fourth embodiment, the inner side surfaces of the recess 51 are each located in the vicinity of the distal end of the corresponding engaging projection 26. However, as shown by a broken line in FIG. 12, the inner surfaces of the recess 51 may each be located in the vicinity of the proximal end of the corresponding engaging projection 26 so that the opening area of the recess 51 is increased.

When flexing the sheet material 24 to attach each stopper 23 to the corresponding first or second switch body 14, 15, the curved portion of the sheet material 24 is inserted in the corresponding recess 51. Thus, the curved portion of each stopper 23 does not abut against the corresponding first or the second switch body 14, 15. That is, as shown by a chain double-dashed line in FIG. 12, the engaging holes 25 of each stopper 23 are easily engaged with the engaging projections 26 of the corresponding first or the second switch body 14, 15 while keeping the sheet material 24 being sufficiently flexed. This facilitates the attaching procedure of the stopper 23.

Figure 13:
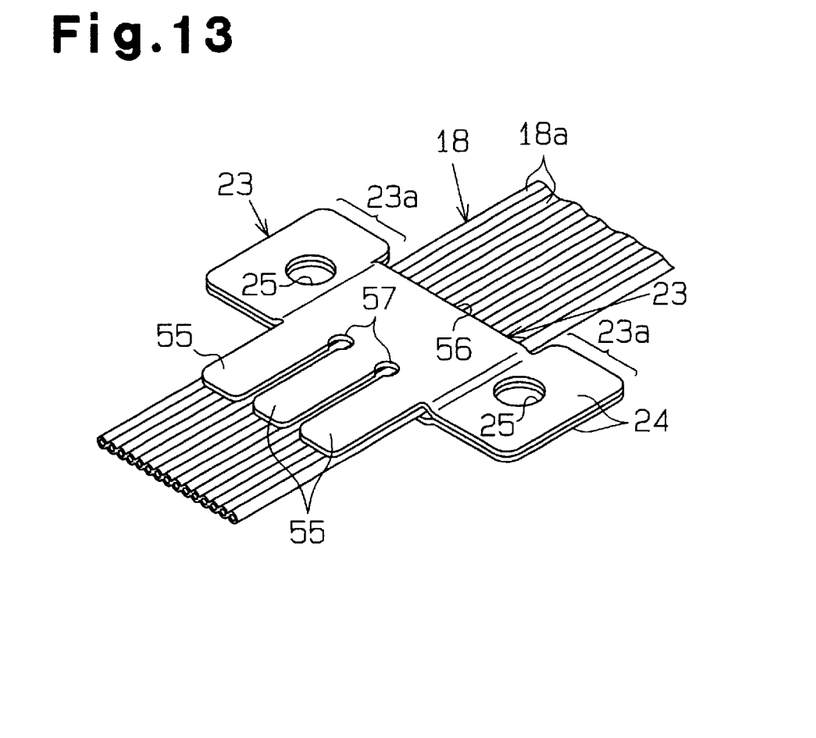
FIG. 13 is a perspective view illustrating a stopper according to a fifth embodiment attached to a flat cable.
Figure 14:
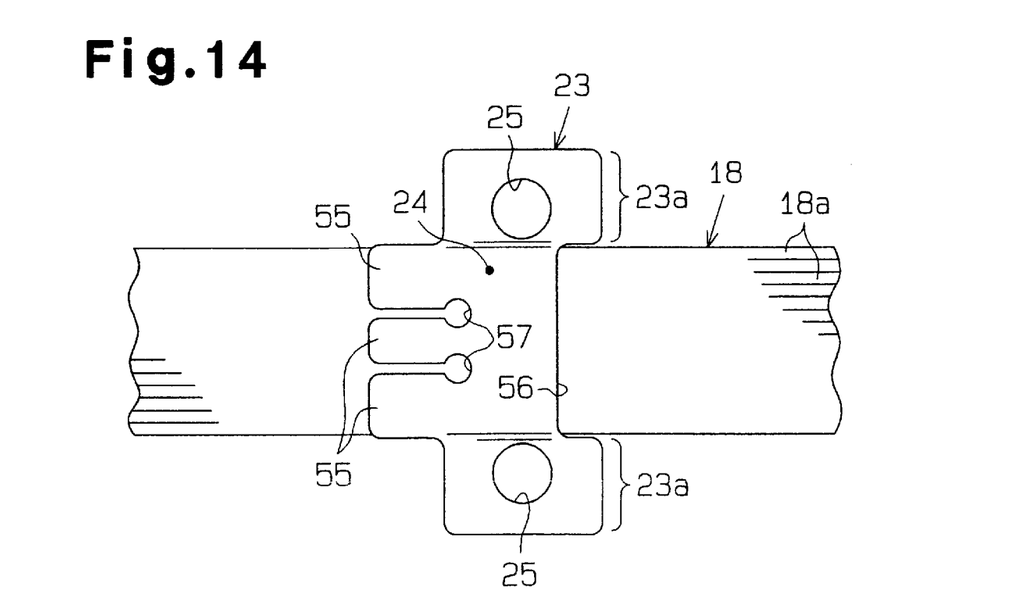
FIG. 14 is a front view of the stopper according to the fifth embodiment.
Figure 15:
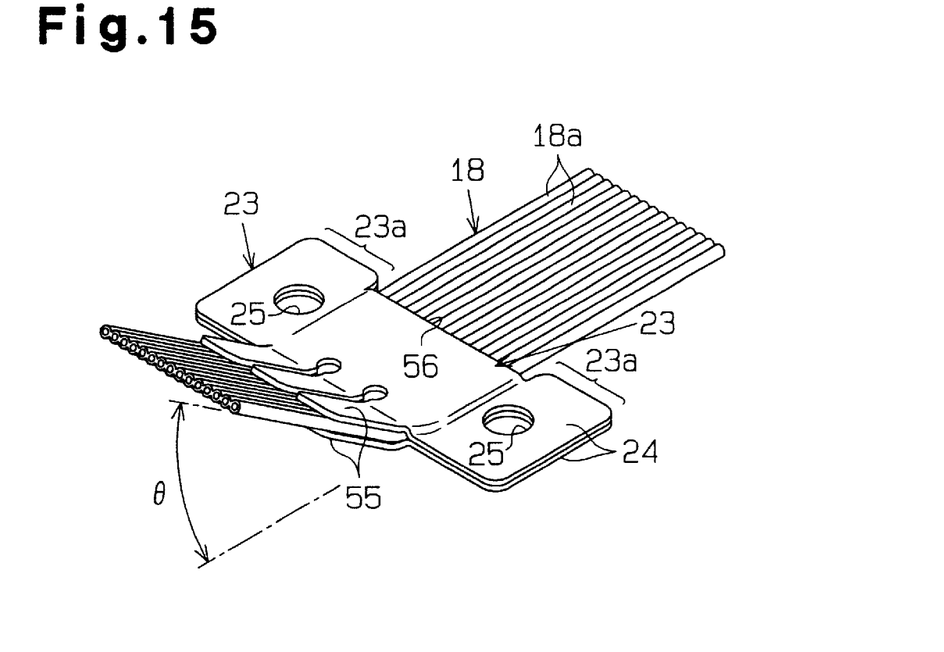
FIG. 15 is a perspective view illustrating the flat cable according to the fifth embodiment in a bent state.

A fifth embodiment of the present invention will now be described with reference to FIGS. 13 to 15. As shown in FIGS. 13 to 15, the sheet material 24 of the fifth embodiment has flexible pieces (flexible members) 55 between two flanges 23a. The flexible pieces 55 are adhered to the flat cable 18 by an adhesive. The flexible pieces 55 on the front side of the flat cable 18 faces the flexible pieces 55 on the rear side of the flat cable 18 with the flat cable 18 arranged in between. The flexible pieces 55 are arranged side by side in the width direction of the flat cable 18. The flexible pieces 55 prevent the flat cable 18 from being bent at large angle θ with the elastic resistance. The sheet material 24 includes a notch 56 on the other side of the flexible pieces 55. The notch 56 facilitates the procedure for attaching the sheet materials 24 to the flat cable 18.

A circular notch 57 is formed between the proximal ends of the adjacent flexible pieces 55 of the sheet material 24. The notches 57 prevent the bending stress that is applied to the proximal ends of the flexible pieces 55 from being concentrated at particular points. The shape of the notches 57 may be changed as long as the notches 57 do not have angular shapes.

In the figures for the fifth embodiment and the following embodiments, engaging projections, which are engaged with the engaging holes 25 of the stopper 23, are not illustrated. The engaging holes 25 of the stopper 23 can be engaged with the engaging projections 26 of the first embodiment or the engaging projections 31 of the second embodiment. Since the engaging structure is the same as the above embodiments, the explanation will be omitted.

In the fifth embodiment, the flexible pieces 55 are arranged on the stopper 23. Therefore, even when bending force is applied to the flat cable 18 from the outside while attaching the flat cable 18 to the first and second switch bodies 14, 15, the flat cable 18 is bent at a small angle. This prevents excessive bending stress from being applied to core wires 18a of the flat cable 18. Therefore, the core wires 18a of the flat cable 18 are prevented from breaking even if the flat cable 18 is bent repeatedly.

The notch 57 is formed between the proximal ends of the adjacent flexible pieces 55. Therefore, even when the flexible pieces 55 are bent with the flat cable 18, the bending stress applied to the proximal ends is dispersed. This prevents the sheet material 24 from being damaged at the proximal ends of the flexible pieces 55 even when the flexible pieces 55 are bent repeatedly. Therefore, the endurance of the stopper 23 is improved.

Further, it is not required to increase the flexural rigidity of the sheet material 24 by changing the thickness of the sheet material 24 to prevent the sheet material 24 from being damaged. Therefore, forming the circular notches 57 on the sheet material 24 also prevents the manufacturing cost of the stopper 23 from increasing.

Figure 16:
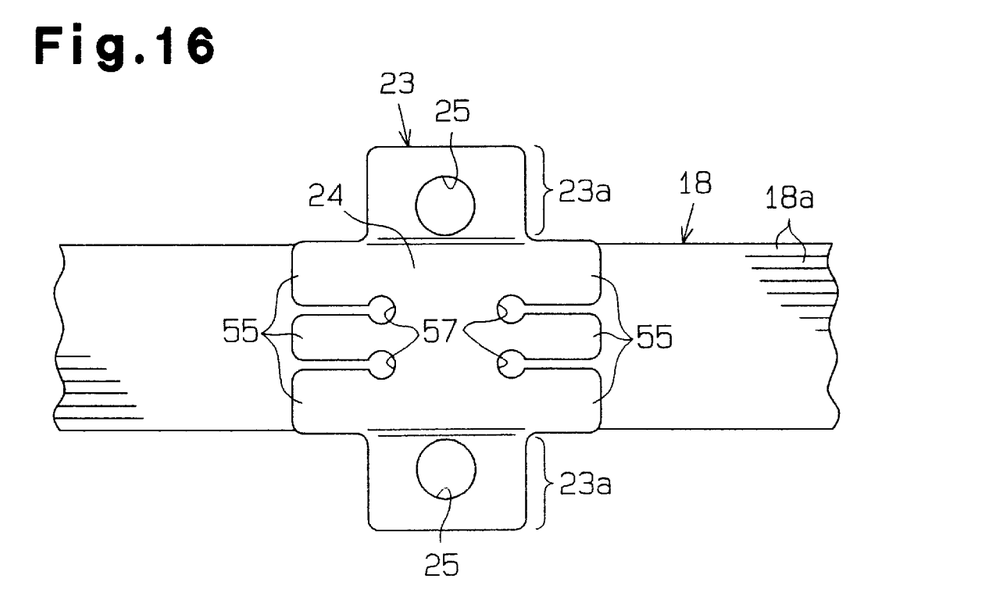
FIG. 16 is a front view of a stopper according to a sixth embodiment.

FIG. 16 shows the flexible pieces 55 according to a sixth embodiment. The flexible pieces 55 are formed on both ends of the sheet material 24. In the sixth embodiment, three flexible pieces 55 are formed on each side of the sheet material 24. That is, one sheet material 24 includes six flexible pieces 55. The number of flexible pieces 55 may be changed as required. Further, the number of the flexible pieces 55 on one side of the sheet material 24 (left side as viewed in FIG. 16) may differ from that of the other side (right side as viewed in FIG. 16).

According to the sixth embodiment, even when the flat cable 18 is bent during the handling procedure before attaching the flat cable 18 to the first and second switch bodies 14, 15, the flat cable 18 is gently bent in the vicinity of the boundary on both sides of the sheet material 24. Therefore, the core wires 18a of the flat cable 18 are more reliably prevented from breaking.

Figure 17:
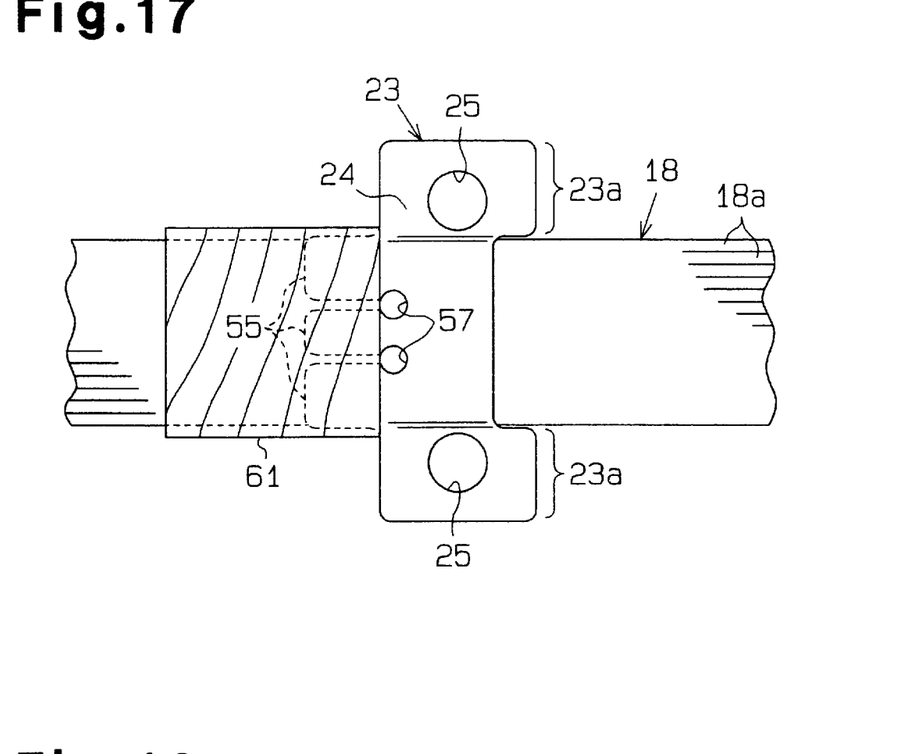
FIG. 17 is a front view of a stopper according to a seventh embodiment.

According to a seventh embodiment shown in FIG. 17, an adhesive tape (coating member) 61 made of synthetic resin is wound about the flat cable 18 in the vicinity of the flexible pieces 55 attached to the stopper 23 that is described in the fifth embodiment (FIG. 13). The adhesive tape 61 covers the entire flexible pieces 55.

Winding the adhesive tape 61 adds an appropriate rigidity to the flat cable 18 in the vicinity of the boundary between the stopper 23 and the flat cable 18. Therefore, even when bending force is applied to the flat cable 18 from the outside, the flat cable 18 is even more gently bent in the vicinity of the stopper 23. In addition, the adhesive tape 61 reinforces the flat cable 18 in the vicinity of the stopper 23. Therefore, even if the flat cable 18 is bent repeatedly, the core wires 18a are more reliably prevented from breaking. Further, wrapping the flexible pieces 55 with the adhesive tape 61 prevents the stopper 23 from being displaced with respect to the flat cable 18.

Instead of wrapping the adhesive tape 61 about the flat cable 18, a plastic tube (not shown), which is fitted to the flat cable 18, may be attached to the flexible pieces 55 of the stopper 23. Another adhesive tape 61 may be wound over the adhesive tape 61.

Figure 18:
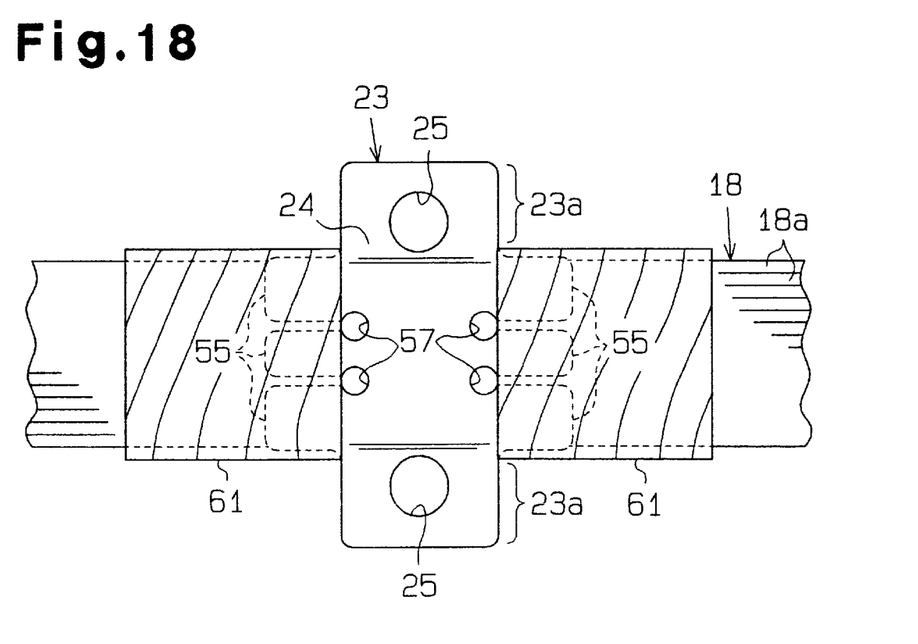
FIG. 18 is a front view of a stopper according to an eighth embodiment.

According to an eighth embodiment shown in FIG. 18, the adhesive tape (coating member) 61 made of synthetic resin is wound about the flat cable 18 in the vicinity of the flexible pieces 55 formed on both sides of the stopper 23 that is described in the sixth embodiment (FIG. 16). The eighth embodiment provides substantially the same advantages as the seventh embodiment. In the same manner as the seventh embodiment, a plastic tube (not shown), which is fitted to the flat cable 18, may be attached to the flexible pieces 55 of the stopper 23 in addition to winding the adhesive tape 61 about the flat cable 18. Another adhesive tape 61 may be wound over the adhesive tape 61.

The embodiments of the present invention may be modified as follows.

Figure 19:
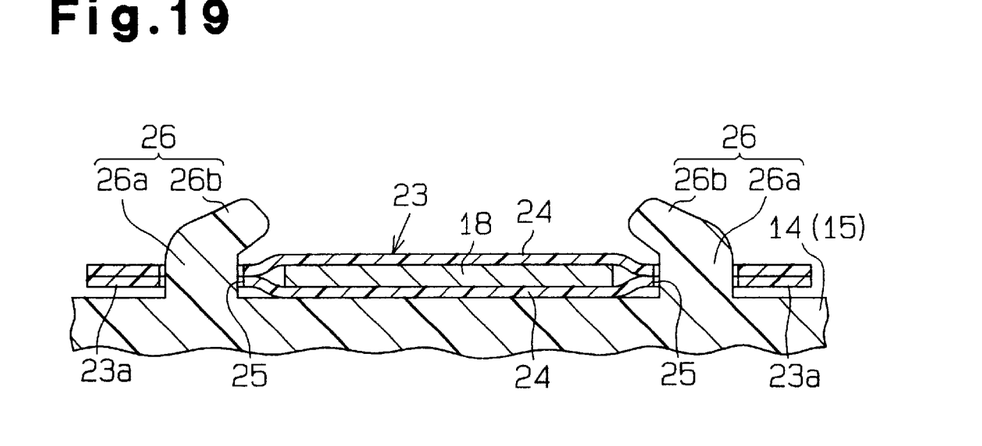
FIG. 19 is a cross-sectional view illustrating the stopper when engaged with the engaging projection according to a modification of the first embodiment.

The engaging projections 26 according to the first embodiment shown in FIG. 4 may be replaced with the engaging projections 26 shown in FIG. 19. That is, although the engaging projections 26 of the first embodiment include L-shaped main portions 26a, the main portions 26a may be straight.

The first to eighth embodiments may be modified as follows. The sheet material 24, which forms the stopper 23, may include one sheet. In this case, one sheet material 24 is folded over the flat cable 18. Particularly, in the fifth to eighth embodiments, the sheet material 24 is folded such that the flexible pieces 55 that are located on the front and the rear side of the flat cable 18 face each other. Then, the contact surfaces between the sheet material 24 and the flat cable 18 are adhered to each other.

Figure 20:
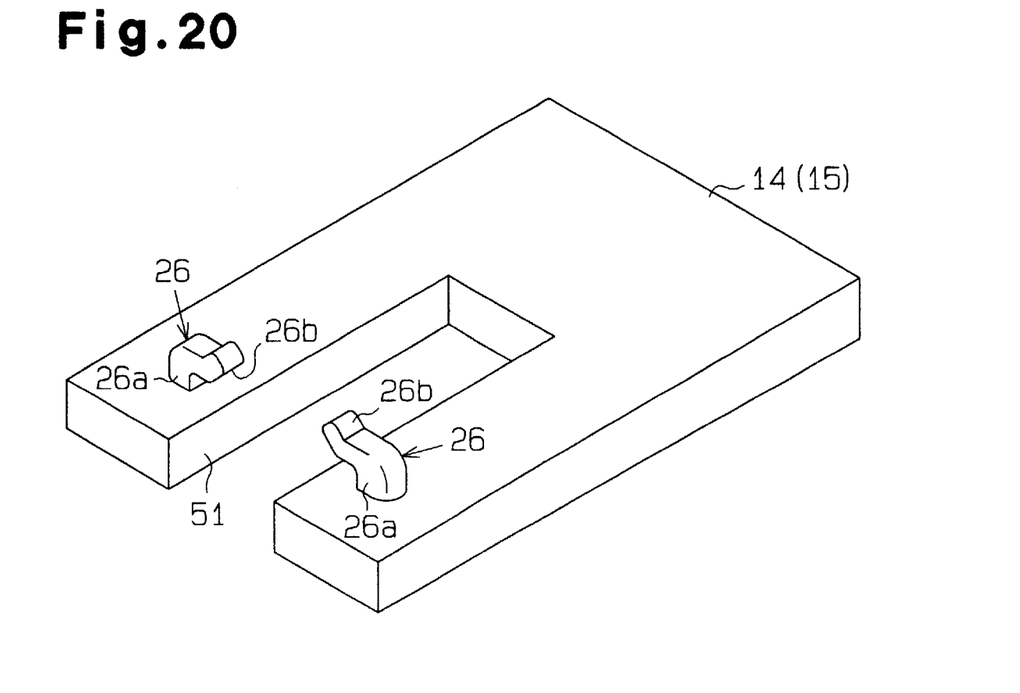
FIG. 20 is a perspective view of a switch body according to a modification of the fourth embodiment.

In the fourth embodiment shown in FIG. 11, the recess 51 is formed in each of the first and the second switch bodies 14, 15. However, as shown in FIG. 20, the bottom surface of the recess 51 may be open.

The mounting structure of the flat cable 18 shown in the first to eighth embodiments may be applied to the fixture 27 located at the middle of the flat cable 18.

In the first to eighth embodiments, the stopper 23 is located on both ends of the flat cable 18. However, the stopper may be located at any position of the flat cable 18.

Therefore, the present examples and embodiments are to be considered as illustrative and not restrictive and the invention is not to be limited to the details given herein, but may be modified within the scope and equivalence of the appended claims.

What is claimed is:

1. A structure for mounting a flat cable to a steering wheel, wherein the flat cable is electrically connected to a switch body, wherein the switch body includes a manipulation switch for operating a device that is installed in an automobile by a remote control, the mounting structure comprising:
 a stopper, which is adhered to the flat cable, wherein the stopper includes a flange at least on one end, wherein the flange extends sideways from the side edge of the flat cable, wherein an engaging hole is formed in the flange; and
 an engaging projection arranged on the switch body, wherein the engaging projection is engaged with the engaging hole of the flange.

2. The mounting structure according to claim 1, wherein the stopper is formed of a sheet material.

3. The mounting structure according to claim 1, wherein the stopper includes a flexible member, which projects along the length of the flat cable at least on one side of the stopper with the flat cable arranged in between.

4. The mounting structure according to claim 3, wherein the flexible member is one of a plurality of flexible members, wherein the flexible members are arranged along the direction of width of the flat cable and are spaced from each other, and wherein a circular notch is formed between the proximal ends of each adjacent pair of the flexible members.

5. The mounting structure according to claim 3, wherein the flat cable includes a coating member, which covers the flexible member.

6. The mounting structure according to claim 1, wherein the engaging projection is a first engaging projection, and a second engaging projection is arranged apart from the first engaging projection, and wherein the first and the second engaging projections are bent such that the distance between the distal ends is narrower than the distance between the proximal ends, wherein the stopper is made of flexible synthetic resin, wherein the engaging hole of the stopper is a first engaging hole, and a second engaging hole is formed apart from the first engaging hole, and wherein each engaging projection is engaged with the corresponding engaging hole while the stopper is flexed.

7. The mounting structure according to claim 6, wherein a first inclined portion is formed at the distal end of the first projection, and a second inclined portion is formed at the distal end of the second projection, and wherein the first and the second inclined portions are inclined at a predetermined angle such that the distance between the first and the second inclined portions increases toward the proximal ends.

8. The mounting structure according to claim 7, wherein a recess is formed in the switch body such that the flexed stopper does not contact the switch body when the stopper bends.

9. The mounting structure according to claim 2, wherein the sheet material is folded over and adhered to the flat cable.

10. The mounting structure according to claim 2, wherein the stopper is made of two sheet materials, wherein the sheet materials are adhered to each other with the flat cable in between.

11. The mounting structure according to claim 6, wherein each of the first and the second engaging projections includes a main portion, which presses stopper against the switch body, and an inclined portion, which is formed integrally with the distal end of the main portion, and wherein each inclined portion guides the inner rim of the corresponding one of the first and the second engaging holes toward the corresponding main portion when the first and the second engaging holes are engaged with the first and the second engaging projections.

12. A stopper for a flat cable for mounting the flat cable to an engaging projection, which is located on a switch body, wherein the flat cable is electrically connected to the switch body, and the switch body includes a manipulation switch for operating a device that is installed in an automobile by a remote control, the stopper comprising:

a flange, which is selectively adhered to the flat cable, and when adhered, the flange extends sideways from the side edge of the flat cable, wherein an engaging hole is formed in the flange, and wherein the engaging hole is engaged with the engaging projection.

13. The stopper for flat cable according to claim 12, wherein the stopper is made of a sheet material.

14. The stopper for flat cable according to claim 12, wherein the stopper includes a flexible member, which projects along the length of the flat cable at least on one side of the stopper with the flat cable arranged in between.

15. The stopper for flat cable according to claim 12, wherein the flexible member is one of a plurality of flexible members, wherein the flexible members are arranged along the direction of width of the flat cable and are spaced from each other, and wherein a circular notch is formed between the proximal ends of each adjacent pair of the flexible members.

16. The stopper for flat cable according to claim 12, wherein the stopper is made of two sheet materials, wherein the sheet materials are adhered to each other with the flat cable in between.

17. The stopper for flat cable according to claim 12, wherein the stopper is made of flexible synthetic resin.

* * * * *

UNITED STATES PATENT AND TRADEMARK OFFICE
CERTIFICATE OF CORRECTION

PATENT NO. : 6,689,971 B2
DATED : February 10, 2004
INVENTOR(S) : Mamoru Miyako et al.

It is certified that error appears in the above-identified patent and that said Letters Patent is hereby corrected as shown below:

<u>Title page,</u>
Item [73], Assignee, delete "Kabushiki Kaisha Tokai Denki Seisakusho", and insert therefore -- Kabushiki Kaisha Tokai Rika Denki Seisakusho --

Signed and Sealed this

Twentieth Day of July, 2004

JON W. DUDAS
*Acting Director of the United States Patent and Trademark Office*